US011611251B2

United States Patent
Yang et al.

(10) Patent No.: US 11,611,251 B2
(45) Date of Patent: Mar. 21, 2023

(54) MOTOR HAVING ASYMMETRIC ROTOR CORE

(71) Applicants: HYUNDAI MOTOR COMPANY, Seoul (KR); KIA MOTORS CORPORATION, Seoul (KR)

(72) Inventors: Hong Seok Yang, Suwon-si (KR); Sang Hwa Do, Seongnam-si (KR); Ji Yeon Kim, Jeongseon-eup (KR); Kyoung Bum Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 227 days.

(21) Appl. No.: 16/939,551

(22) Filed: Jul. 27, 2020

(65) Prior Publication Data

US 2021/0111602 A1 Apr. 15, 2021

(30) Foreign Application Priority Data

Oct. 11, 2019 (KR) .................... 10-2019-0125793

(51) Int. Cl.
*H02K 1/27* (2022.01)
*H02K 1/26* (2006.01)
*H02K 21/14* (2006.01)
*H02K 1/276* (2022.01)

(52) U.S. Cl.
CPC ............. *H02K 1/2766* (2013.01); *H02K 1/26* (2013.01); *H02K 21/14* (2013.01)

(58) Field of Classification Search
CPC ........ H02K 1/2766; H02K 1/26; H02K 21/14; H02K 2213/03; H02K 2201/03

USPC ..................................................... 310/156.53
See application file for complete search history.

(56) References Cited

U.S. PATENT DOCUMENTS

| 6,917,133 | B2 * | 7/2005 | Koharagi | H02K 21/16 310/156.56 |
| 7,906,882 | B2 * | 3/2011 | Okuma | H02K 1/276 310/156.56 |
| 7,960,886 | B2 * | 6/2011 | Miura | H02K 1/2766 310/156.57 |
| 8,227,953 | B2 * | 7/2012 | Suzuki | H02K 1/2766 310/156.56 |
| 8,541,918 | B2 * | 9/2013 | Mizuike | H02K 15/00 310/90 |
| 8,546,990 | B2 * | 10/2013 | Suzuki | H02K 1/2766 310/156.53 |

(Continued)

FOREIGN PATENT DOCUMENTS

KR   2020-0081029 A   7/2020

*Primary Examiner* — Alex W Mok
(74) *Attorney, Agent, or Firm* — McDonnell Boehnen Hulbert & Berghoff LLP (57) ABSTRACT

The present disclosure provides a motor having an asymmetric rotor core that can more effectively improve operation efficiency of a motor and improve NVH performance in correspondence to the tendency of high power and high efficiency of motors by asymmetrically forming a first slot and a second slot for inserting permanent magnets of the rotor core, arranging a first permanent magnet and a second permanent magnet at different embedment angles, and forming a separation wall inclined at a predetermined angle and having a uniform thickness between the first slot and the second slot.

17 Claims, 6 Drawing Sheets

(56) References Cited

U.S. PATENT DOCUMENTS

| | | | | |
|---|---|---|---|---|
| 9,627,933 | B2* | 4/2017 | Jiang | H02K 1/278 |
| 9,680,341 | B2* | 6/2017 | Takeda | H02K 1/28 |
| 10,075,034 | B2* | 9/2018 | Mukai | F04C 18/0215 |
| 10,186,918 | B2* | 1/2019 | Kim | H02K 1/2773 |
| 2011/0163624 | A1* | 7/2011 | Hori | H02K 1/2766 |
| | | | | 310/156.53 |
| 2012/0256508 | A1* | 10/2012 | Suzuki | H02K 1/2766 |
| | | | | 310/156.38 |
| 2014/0184009 | A1* | 7/2014 | Taniguchi | H02K 1/2746 |
| | | | | 310/156.53 |
| 2015/0236555 | A1* | 8/2015 | Takeda | H02K 1/28 |
| | | | | 310/156.53 |
| 2019/0199147 | A1* | 6/2019 | Woo | H02K 1/2706 |

\* cited by examiner

FIG. 1

Prior Art

FIG. 2

Prior Art

MOTOR HAVING ASYMMETRIC ROTOR CORE

CROSS REFERENCE TO RELATED APPLICATIONS

The present application claims priority to Korean Patent Application No. 10-2019-0125793, filed Oct. 11, 2019, the entire contents of which are incorporated herein for all purposes by this reference.

BACKGROUND

Field

The present disclosure relates to a motor core having an asymmetric rotor core and, more particularly, the motor being able to improve operation efficiency of a motor and improve NVH performance.

Description of the Related Art

In general, an Interior Permanent Magnet Synchronous Motor (IPMSM) in which a permanent magnet is embedded in a rotor is generally used in correspondence to the tendency of high power and high efficiency as a driving motor for eco-friendly vehicles such as a hybrid vehicle and an electric vehicle.

Figure 1:
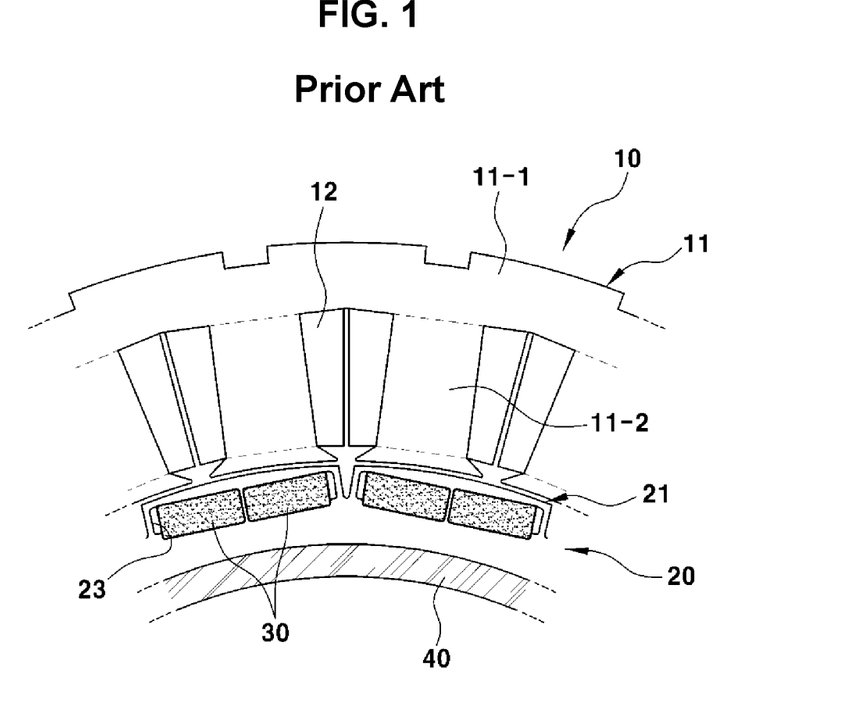
FIG. 1 is a partially enlarged view showing an Interior Permanent Magnet Synchronous Motor (IPMSM) having an I-type rotor in the related art.

FIG. 1 is a partially enlarged view showing an IPMSM having an I-type rotor in the related art.

As shown in FIG. 1, the IPMSM includes a stator 10, a rotor 20 disposed with a gap from the stator 10, and a plurality of permanent magnets 30 disposed in the rotor 20.

The stator 10 includes a stator core 11 in which a plurality of steel plates are stacked, and a stator coil 12 wound around the stator core 11, and the rotor 20 includes a rotor core 21 in which a plurality of steel plates are stacked.

The rotor core 21 is fixed to the outer circumferential surface of a shaft 10 of the motor.

In particular, a plurality of slots 23 are circumferentially formed on the rotor core 21 and the permanent magnets 30 are inserted in the slots 23, respectively.

The adjacent slots 23 of the rotor core 21 have a symmetric structure, so adjacent permanent magnets 30 are also symmetrically arranged.

In this IPMSM, an NVH performance against noise, vibration, and harshness is an important factor that should be considered with motor efficiency, and the reason is that when noise of the motor is intense, it may be harsh to the driver's ears and the commercial value may be greatly deteriorated.

However, the motor efficiency and improvement of the NVH are in a trade-off relationship, so it is difficult to improve both of these factors.

Methods of changing the materials of electrical steels and permanent magnets, improving a space factor (a coil area per slot area), and improving bearings for minimizing mechanical losses are applied in order to improve the motor efficiency, but there is a problem that these methods considerably increase the manufacturing cost.

On the other hand, there are methods of increasing the number of electrodes/slots, applying stator/rotor core skew (rotational stacking), etc. as methods for improving the NVH, but in these cases, there is a problem that not only the manufacturing cost is increased, but also the motor efficiency is deteriorated.

In order to solve these problems, the applicant(s) has filed Patent Application (10-2018-0171114 (2018.12.27)) in which an IPMSM that can effectively improve the efficiency of a motor and the NVH performance only by changing some shapes such as a permanent magnet embedment structure of a rotor core, and a rotor included in the IPMSM has been disclosed.

However, there is a need for a method of more effectively increasing the efficiency of a motor and reducing NVH in correspondence to the tendency of high power and high efficiency of motors.

SUMMARY

The present disclosure has been made in an effort to solve the problems and an objective of the present disclosure is to provide a motor having an asymmetric rotor core, the motor being able to more effectively improve operation efficiency of a motor and improve NVH performance in correspondence to the tendency of high power and high efficiency of motors by changing slot and lip structures for embedding permanent magnets of a rotor core.

In order to achieve the objects, an aspect of the present disclosure provides a motor having an asymmetric rotor core that includes a rotor core including a first slot and a second slot being circumferentially and continuously formed in an asymmetric arrangement, a first permanent magnet configured to be inserted into the first slot with a first embedment angle, and a second permanent magnet configured to be inserted into the second slot with a second embedment angle, wherein the first embedment angle is different from the second embedment angle, a plurality of stator cores each having a ring-shaped yoke and a plurality of teeth extending inward from the yoke to wind a stator coil, the plurality of stator cores being spaced apart from each other with a gap on an outer side of the rotor core, wherein the first embedment angle of the first permanent magnet is larger than the second embedment angle of the second permanent magnet with respect to a rotational direction of the rotor core, and a separation wall is positioned between the first slot and the second slot, wherein the separation wall is inclined at a predetermined angle such that an inner surface of the second permanent magnet is in contact with a first surface of the separation wall and a portion of an inner surface of the first permanent magnet is supported on a second surface of the separation wall.

A first supporting portion may protrude from an upper end of an inner surface of the first slot to support an outer edge of the inner surface of the first permanent magnet.

A second supporting portion may protrude from a lower end of an outer surface of the first slot to support an inner edge of an outer surface of the first permanent magnet.

A third supporting portion may protrude from a lower end of an outer surface of the first slot to support an inner edge of an outer surface of the second permanent magnet.

In particular, a stress reduction groove may be formed on an inner side of the rotor core at a position biased from the separation wall to the first slot.

The stress reduction groove may have an arc-shaped cross-section that is concave toward the outer side of the rotor core.

A distance from a position where an inner edge of the inner surface of the first permanent magnet is in contact with an inner surface of the first slot to a deepest point in the stress reduction groove may be larger than a distance from the deepest point in the stress reduction groove to an intersection of a virtual circumferential extending line of the inner side of the rotor core and a line passing through a center of the stress reduction groove.

A distance from a position where an inner edge of the inner surface of the first permanent magnet is in contact with an inner surface of the first slot to a deepest point in the stress reduction groove may be double a distance from the deepest point in the stress reduction groove to an intersection of a virtual circumferential extending line of the inner side of the rotor core and a line passing through a center of the stress reduction groove.

A distance from a position where an inner edge of the inner surface of the first permanent magnet is in contact with an inner surface of the first slot to a deepest point in the stress reduction groove may be the same as a distance from the deepest point in the stress reduction groove to a center of the stress reduction groove.

The embedment angle of the first permanent magnet and the embedment angle of the second permanent magnet may be selected from a range of 5 to 10 degrees, such that the embedment angle of the first permanent magnet is larger than the embedment angle of the second permanent magnet.

Asymmetric first and second notches of which one of widths and angles is different may be formed at a position where the first slot is formed and a position where the second slot is formed on the outer side of the rotor core.

Asymmetric third and fourth notches of which one of the widths and the angles is different may be formed at positions facing the rotor core on an end of each of the teeth of the stator core.

The present disclosure provides the following effects from the objects described above.

First, a separation wall inclined at a predetermined angle and having a uniform thickness is formed between the first slot and the second slot such that an inner surface of the second permanent magnet is in close contact with a first surface of the separation wall and an outer edge of an inner surface of the first permanent magnet is supported on a second surface of the separation wall. Accordingly, it is possible to minimize leakage of magnetic flux and distribute and reduce stress concentrating on the second slot in which the second permanent magnet is inserted, so it is possible to satisfy the strength of the asymmetric rotor core over a minimum reference of margin of safety.

Second, since a stress reduction groove is formed on the inner side of the rotor core at a position biased from the separation wall to the first slot, it is possible to reduce the stress concentrating on the first slot in which the first permanent magnet is inserted. Accordingly, it is possible to satisfy the strength of the asymmetric rotor core over a minimum reference of margin of safety.

Third, since a pair of asymmetric notches is formed respectively at an end of a tooth of a stator core and on the outer side of a slot unit of the rotor core, it is possible to maximize use of reluctance torque and reduce torque ripple by distributing a magnetic flux concentration saturation area when motor torque is generated.

Further, since the embedment angle of the first permanent magnet inserted in the first slot of the rotor core is larger than an embedment angle of the second permanent magnet inserted in the second slot, it is possible to improve motor efficiency, as compared with an existing I-type rotor. Further, it is possible to effectively improve an NVH characteristic by reducing torque ripple.

BRIEF DESCRIPTION OF THE FIGURES

The above and other objects, features and other advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings.

Figure 3:
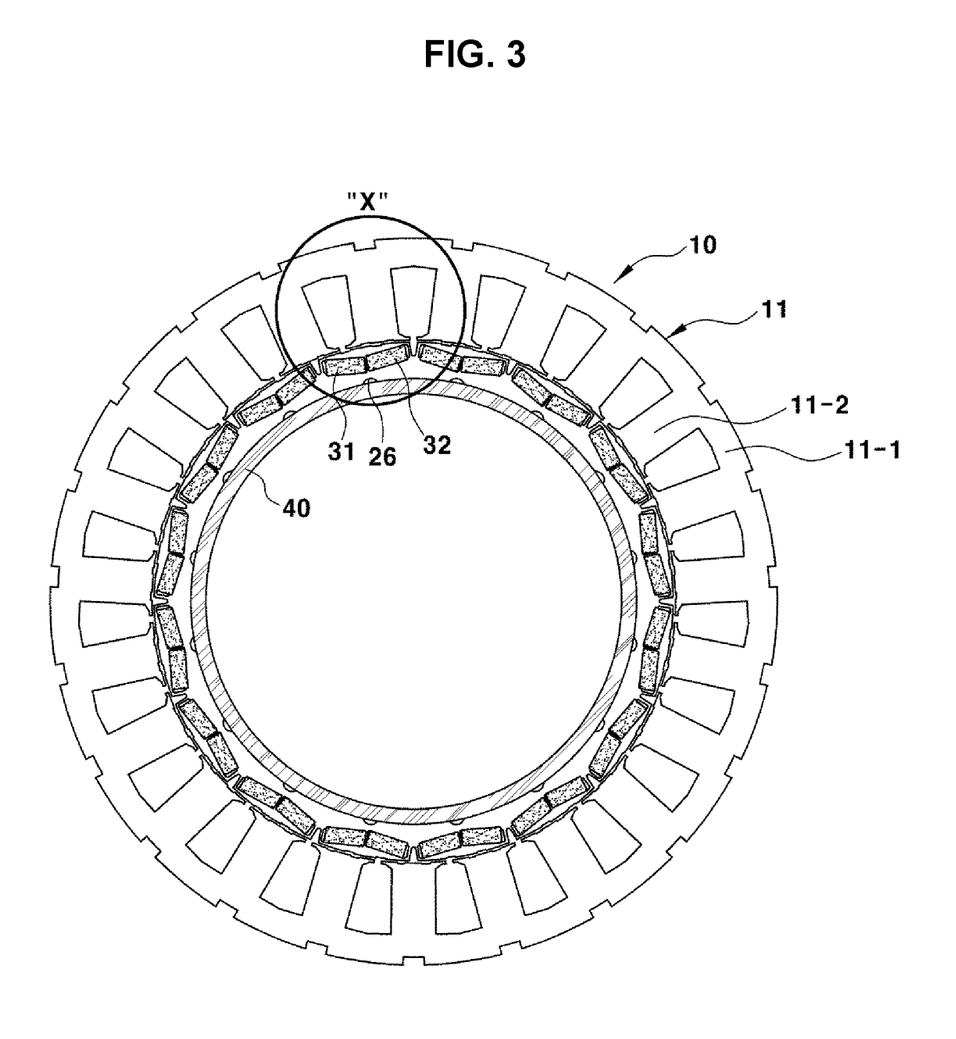
FIG. 3 is a cross-sectional view showing a motor having an asymmetric rotor core according to the present disclosure.
Figure 4:
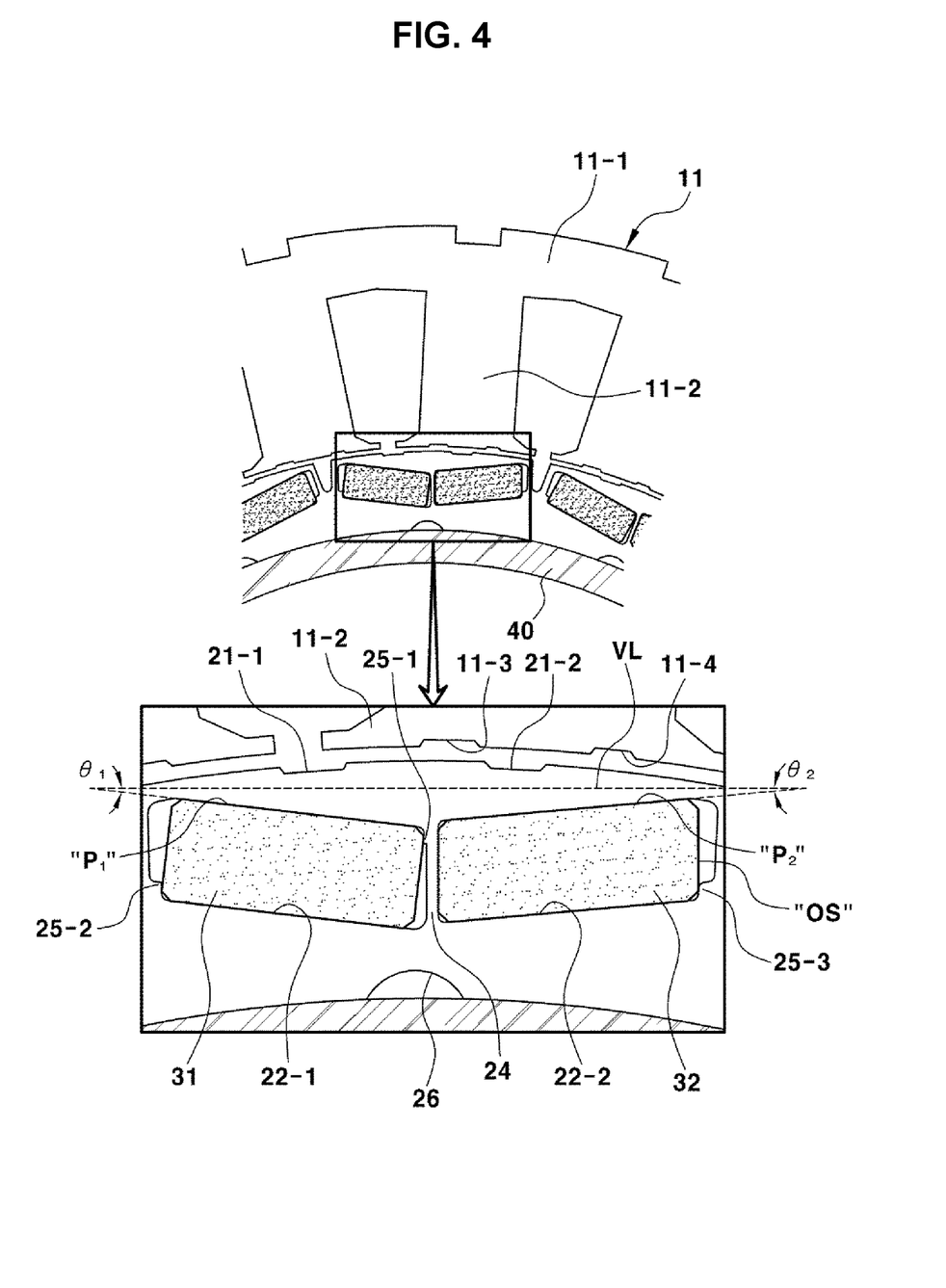
FIG. 4 is a cross-sectional view enlarging main parts X of the motor having an asymmetric rotor core shown in FIG. 3.

FIG. 3 is a cross-sectional view showing a motor having an asymmetric rotor core according to the present disclosure and FIG. 4 is a cross-sectional view enlarging main parts X of the motor having an asymmetric rotor core shown in FIG. 3.

As shown in FIGS. 3 and 4, an Interior Permanent Magnet Synchronous Motor (IPMSM) according to an exemplary embodiment of the present disclosure includes a stator 10, a rotor 20 disposed inside the stator 10 with a predetermined gap therebetween, and a plurality of permanent magnets 30 disposed in a rotor core 21.

The stator 10 includes a plurality of stacked stator cores 11 and the rotor 20 includes a plurality of stacked rotor cores 21 (i.e., 21-1 and 21-2).

For reference, the inner side of the rotor core 21 is fixed to the outer circumferential surface of a shaft 40 of the motor.

The rotor core 21 has a structure in which a plurality of slot units 22, each including a first slot 22-1 and a second slot 22-1, which make an asymmetric arrangement, is circumferentially and continuously formed.

The slot units 22 each may include an N-polar slot unit 22 and an S-polar slot unit 22 alternately formed in the circumferential direction of the rotor core 21.

Accordingly, permanent magnets having the same polarity are respectively inserted in slots of the N-polar slot unit 22 to form N-polar single magnetic poles, respectively, while the permanent magnets having the same polarity are inserted in the slots of the S-polar slot unit 22 to form S-polar signal magnetic poles, respectively.

In particular, the first slot 22-1 and the second slot 22-2 of the rotor core 21 are formed with asymmetric inclinations such that the embedment angle $\theta_1$ of the first permanent magnet 31 inserted in the first slot 22-1 and the embedment angle $\theta_2$ of the second permanent magnet 32 inserted in the second slot 22-2 are different.

The inclination of the first slot 22-1 is larger than the inclination of the second slot 22-2 such that the embedment angle $\theta_1$ of the first permanent magnet 31 inserted in the first slot 22-1 is larger than the embedment angle $\theta_2$ of the second permanent magnet 32 inserted in the second slot 22-2.

The embedment angle $\theta_1$ of the first permanent magnet 31 and the embedment angle $\theta_2$ of the second permanent magnet 32 mean embedment angles when the first permanent magnet 31 and the second permanent magnet 32 are inserted in the first slot 22-1 and the second slot 22-2, respectively.

For example, according to the direction shown in FIG. 4, when the uppermost point (P1) of the first slot 22-1 and the uppermost point (P2) of the second slot 22-2 are connected by a virtual straight line (VL), the angle $\theta_1$ between the virtual line and the top surface of the first slot 22-1 may be set as the embedment angle $\theta_1$ of the first permanent magnet 31 and the angle $\theta_2$ between the virtual line and the top surface of the second slot 22-2 may be set as the embedment angle $\theta_2$ of the second permanent magnet 32.

The embedment angle $\theta_1$ of the first permanent magnet 31 and the embedment angle $\theta_2$ of the second permanent magnet 32 may be set within the range of 5 to 10 degrees such that the embedment angle $\theta_1$ of the first permanent magnet 31 is larger than the embedment angle $\theta_2$ of the second permanent magnet 32 with respect to the rotational direction of the rotor core 21.

For example, the embedment angle $\theta_1$ of the first permanent magnet 31 may be set as 10 degrees and the embedment angle $\theta_2$ of the second permanent magnet 32 may be set as 7.5 degrees with respect to the rotational angle of the rotor core 21.

Alternatively, the embedment angle $\theta_1$ of the first permanent magnet 31 may be set as 7 degrees and the embedment angle $\theta_2$ of the second permanent magnet 32 may be set as 5 degrees with respect to the rotational angle of the rotor core 10.

A separation wall 24 having a uniform thickness and inclined at a predetermined angle is formed between the first slot 22-1 and the second slot 22-2.

The separation wall 24 is formed such that the inner surface of the second permanent magnet 32 inserted in the second slot 22-2 is in close contact with a first surface of the separation wall 24 and an outer edge of the inner surface of the first permanent magnet embedded in the first slot 22-1 is supported on a second surface of the separation wall 24.

Figure 5:
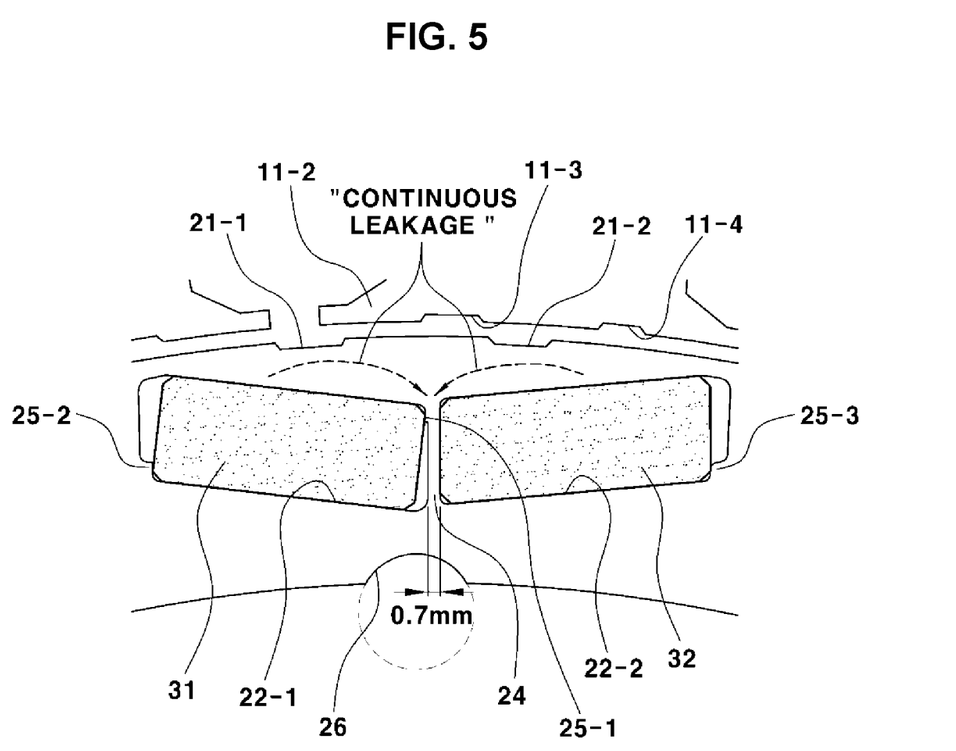
FIG. 5 is an enlarged cross-sectional view showing main parts and a leakage direction of magnetic flux to separation walls of the motor having an asymmetric rotor core according to the present disclosure.

When magnetic flux is generated between an N-polar permanent magnet 31 and an S-polar permanent magnet 32, as shown in FIG. 5, there is a possibility of magnetic flux leaking through the separation wall 24 of the rotor core 21. Accordingly, it is advantageous to make the thickness of the separation wall 24 uniform and to set the thickness such that magnetic flux leakage can be minimized (e.g., 0.7 mm).

As described above, since the separation wall 24 having a uniform thickness and inclined at a predetermined angle is formed between the first slot 22-1 and the second slot 22-1 of the rotor core 21 such that the inner surface of the second permanent magnet 32 is in close contact with the first surface of the separation wall 24, magnetic flux leakage can be minimized. In particular, stress that concentrates on the second slot 22-2 in which the second permanent magnet 32 is inserted can be distributed and reduced at the portion where the separation wall 24 and the second permanent magnet 32 are in close contact with each other, whereby it is possible to satisfy the strength of the asymmetric rotor core over a minimum reference of margin of safety.

Meanwhile, in order to secure that the inner surface of the second permanent magnet 32 is in close contact with the first surface of the separation wall 24 and the outer edge of the inner surface of the first permanent magnet 31 is supported on the second surface of the separation wall 24, and in order to secure that the first permanent magnet 31 inserted in the first slot 22-1 and the second permanent magnet 32 inserted in the second slot 22-2 are fixed, a first supporting portion 25-1 and a second supporting portion 25-2 are formed in the first slot 22-1 and a third supporting protrusion 25-3 is formed in the second slot 22-2.

The first supporting portion 25-1 integrally protrudes from the upper end of the inner surface (right surface in FIG. 4) of the first slot 22-1, thereby supporting the outer edge of the inner surface of the first permanent magnet 31. Further, the second supporting portion 25-2 integrally protrudes from the lower end of the outer surface (left surface in FIG. 4) of the first slot 22-1, thereby supporting the inner edge of the outer surface of the first permanent magnet 31. Accordingly, the first permanent magnet 31 inserted in the first slot 22-1 can be retained in a fixed state without shaking.

Further, the third supporting portion 25-3 integrally protrudes from the lower end of the outer surface (right surface in FIG. 4) of the second slot 22-2, thereby supporting the inner edge of the outer surface (OS) of the second permanent magnet 32. Accordingly, the inner surface of the second permanent magnet 32 inserted in the second slot 22-2 can be retained in a fixed state without shaking in contact with the first surface of the separation wall 24.

The stress that concentrates on the second slot 22-2 in which the second permanent magnet 32 is inserted can be distributed and reduced at the portion where the separation wall 24 and the permanent magnet 32 are in close contact with each other. However, the inner surface (IS) of the first permanent magnet 31 is spaced apart from the second surface of the separation wall due to the embedment angle $\theta_1$ of the first permanent magnet 31, so stress may concentrate on the lower end of the inner surface (right surface in FIG. 6) of the first slot 22-1 and the inner edge of the inner surface of the first permanent magnet 31, as shown in FIG. 6.

Accordingly, it is possible to satisfy the strength of the asymmetric rotor core over a minimum reference of margin of safety only when reducing the stress that concentrates on the lower end of the inner surface (right surface in FIG. 6) of the first slot 22-1 and the inner edge of the inner surface of the first permanent magnet 31.

Figure 6:
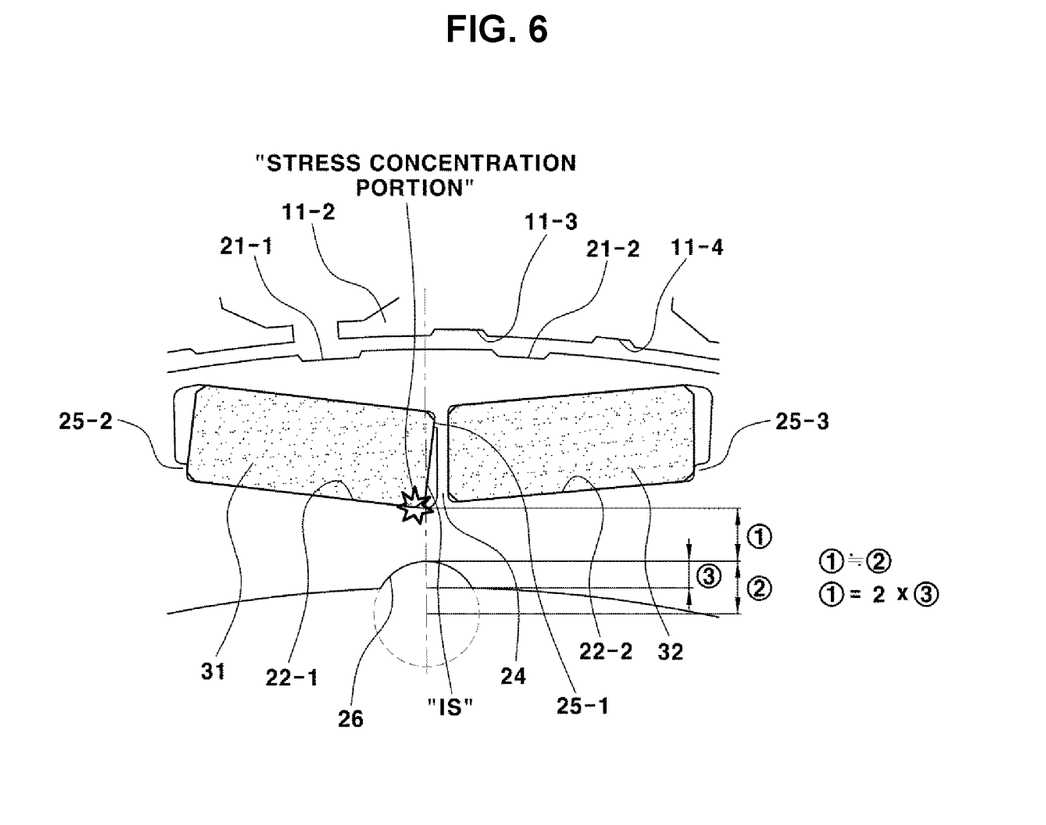
FIGS. 6 and 7 are enlarged cross-sectional views showing main parts to describe the position where a stress reduction groove is formed and the position thereof in the motor having an asymmetric rotor core according to the present disclosure.
Figure 7:
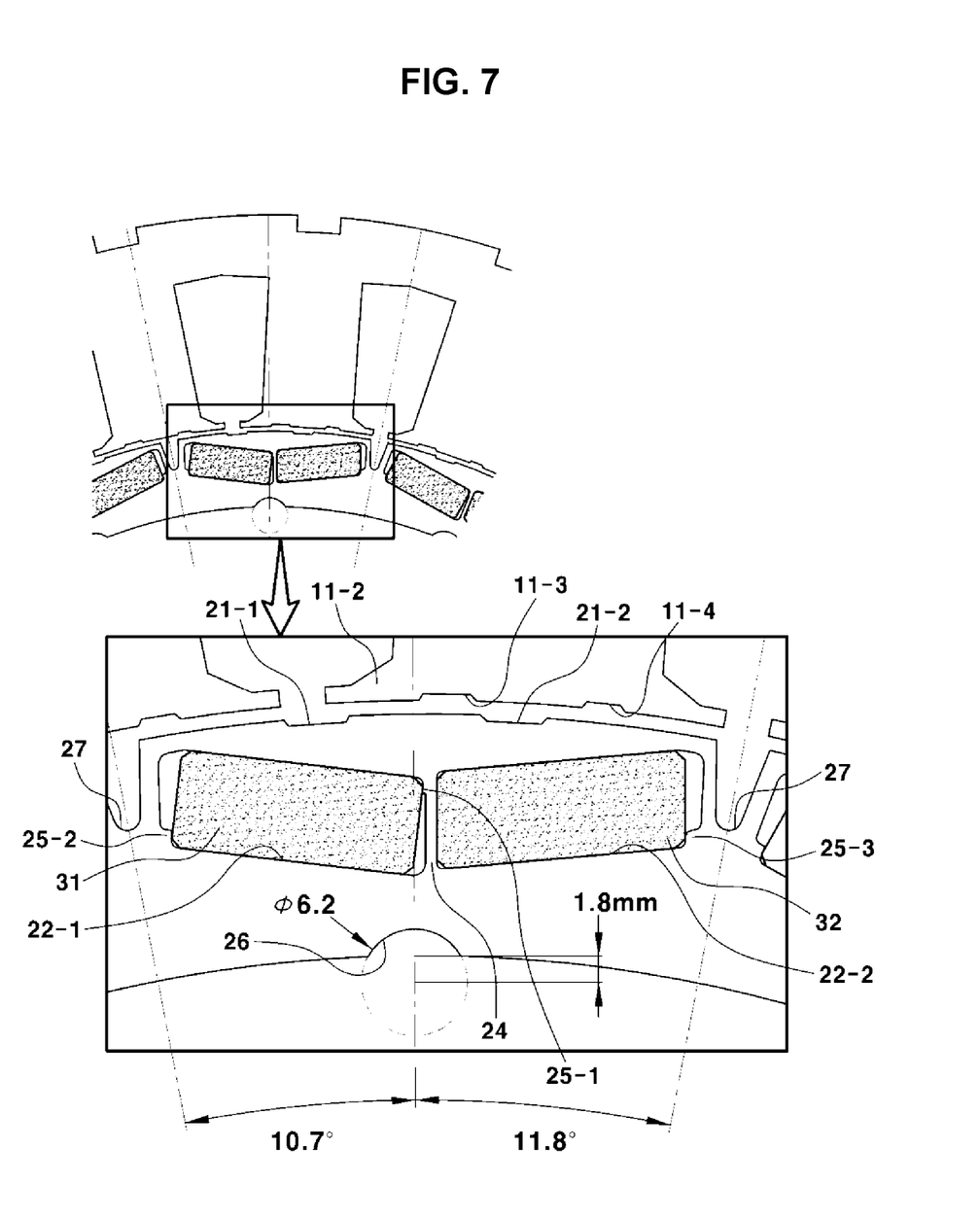

To this end, as shown in FIGS. 6 and 7, a stress reduction groove 26 is formed on the inner side of the rotor core 21 at a position biased to the first slot 22-1 from the separation wall 24.

The stress reduction groove 26 has an arc-shaped cross-section, which is concave toward the outer side of the stator core 21, and is formed at a position on the inner side of the rotor core 21 that vertically corresponds to the lower end of the inner surface (right surface in FIG. 6) of the first slot 22-2 and the inner edge of the inner surface of the first permanent magnet 32, that is, the portion where stress concentrates.

For example, as shown in FIG. 7, a V-shaped groove 27 is formed on the outer side of the rotor core 21 between the slot units 22 each having the first slot 22-1 and the second slot 22-2. The stress reduction groove 26 may be formed on the inner side of the rotor core 21 at about 10.7 degrees clockwise from a V-shaped groove 27 and at about 11.8 degrees counterclockwise from another V-shaped groove 27.

In particular, the position and the size of the stress reduction groove 26 should be set not to influence the flow of magnetic flux.

Referring again to FIG. 6, the distance ① from the position where the inner edge of the inner surface of the first permanent magnet 31 is in contact with the inner surface of the first slot 22-1 to the deepest point in the stress reduction groove 26 is larger than the distance ③ from the deepest point in the stress reduction groove 26 to the intersection of a virtual circumferential extending line of the inner side of the rotor core 21 and a line passing through the center of the stress reduction groove 26.

As shown in FIG. 6, the distance ① from the position where the inner edge of the inner surface of the first permanent magnet 31 is in contact with the inner surface of the first slot 22-1 to the deepest point in the stress reduction groove 26 may be double the distance ③ from the deepest point in the stress reduction groove 26 to the intersection of a virtual circumferential extending line of the inner side of the rotor core 21 and a line passing through the center of the stress reduction groove 26.

Further, the distance ① from the position where the inner edge of the inner surface of the first permanent magnet 31 is in contact with the inner surface of the first slot 22-1 to the deepest point in the stress reduction groove 26 is the same as the distance ② from the deepest point in the stress reduction groove 26 to the center of the stress reduction groove 26.

For example, as shown in FIG. 7, when the diameter of the stress reduction groove 26 is φ 6.2, the distance between the line extending from the inner side of the rotor core 21 and the center of the stress reduction groove 26 is set as 1.8 mm such that the stress reduction groove 26 has an arc smaller then a semicircle.

As described above, since the stress reduction groove 26 is formed at a position on the inner side of the rotor core 21 that vertically corresponds to the lower end of the inner surface (right surface in FIG. 6) of the first slot 22-2 and the inner edge of the inner surface of the first permanent magnet 32, that is, the portion where stress concentrates, it is possible to reduce stress that concentrates on the first slot 22-1 in which the first permanent magnet 31 is inserted, and to satisfy the strength of the asymmetric rotor core over a minimum reference of margin of safety.

Further, since the position and the size of the stress reduction groove 26 are set within a range that does not influence flow of magnetic flux, as described above, it is possible to prevent deterioration of the performance of the motor.

On the other hand, the stator 10 (FIG. 3) is composed of a plurality of stator cores 11, which are formed by stacking multiple core plates and spaced apart from each other with a gap from the outer side of the rotor core 21. Each stator core 11 has a ring-shaped yoke 11-1 and a plurality of teeth 11-2 extending inward from the yoke to wind the stator coil 12.

Referring again to FIG. 4, asymmetric third and fourth notches 11-3 and 11-4, of which one of the widths and the angles is different, are formed at positions facing the rotor core 21 on the end of each tooth 11-2 of the stator core 11.

Further, asymmetric notch first and second notches 21-1 and 21-2 of which one of the widths and angles is different, are formed at a position where the first slot 22-1 is formed and a position where the second slot 22-2 is formed on the outer side of the rotor core 21.

The reason that the asymmetric third notch 11-3 and fourth notch 11-4 are formed on each tooth 11-2 of the rotor core 11 and the asymmetric first notch 21-1 and second notch 21-2 are formed on the rotor core 21 is for inducing reduction of torque ripple and cogging torque of the motor.

Experimental Example

As a comparative example 1 (related art), the IPMSM having the I-type rotor described above with reference to FIG. 1 was selected.

Figure 2:
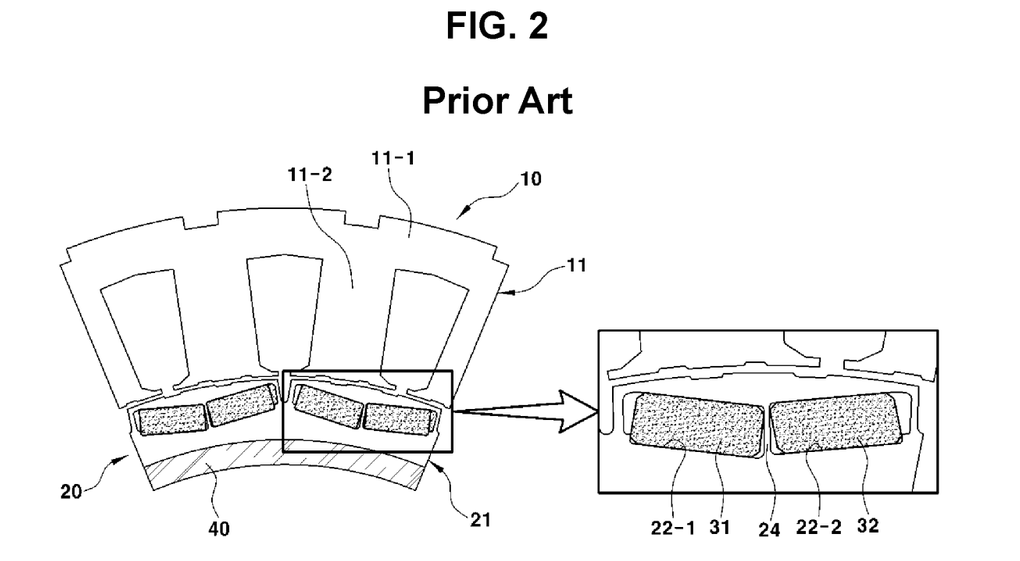
FIG. 2 is a partially enlarged view showing an IPMSM having an asymmetric rotor core in the related art.

As a comparative example 2 (related art), as shown in FIG. 2, an IPMSM that includes a rotor core 21 having asymmetric first slot 22-1 and second slot 22-2 in which the embedment angle of a first permanent magnet 31 is 10 degrees, the embedment angle of a second permanent magnet 32 is 7.7 degrees, and a separation wall is formed to be vertically erect was selected.

As an embodiment (present disclosure), the IPMSM of the present disclosure described above with reference to FIGS. 3 to 7 was selected.

Torque ripple and cogging torque were measured using a common method to determine maximum stress (margin of safety), motor efficiency (%), and NVH performance of the IPMSMs according to the comparative example 1 (related art), the comparative example 2 (related art), and embodiment (present disclosure) selected, as described above, and the result is shown in the following Table 1.

TABLE 1

| | | Comparative example 1 (related art) | Comparative example 1 (related art) | Embodiment (present disclosure) |
|---|---|---|---|---|
| Maximum stress[Mpa] (Margin of safety) | | 216.63(1.84) | 514.69(0.77) | 293.7(1.36) |
| Efficiency (%) | | Reference | +0.1 | +0.07 |
| VH | Torque ripple[%]@EV Acceleration under medium load | 0.9 | 0.8 | 0.4 |
| | Cogging torque[Nm]@Creep | 2.7 | 1.5 | 1.5 |

As shown in Table 1, comparative example 2 has asymmetric arrangement in which the embedment angle of a first permanent magnet is larger than the embedment angle of a second permanent magnet, but the measured maximum stress (margin of safety) is 0.77 less than 1.2 that is a reference value, so there is a defect that the strength of the asymmetric rotor core dropped less than a reference value.

However, in the present disclosure, it can be seen that the measured maximum stress (margin of safety) is 1.36 larger than the reference value 1.2, so the strength of the asymmetric rotor core is satisfied over the reference value.

Further, the motor efficiency of the present disclosure is improved by +0.07% with respect to the efficiency of the comparative example 1.

Further, in the present disclosure, the torque ripple for determining the NVH performance decreases in comparison to that of the comparative example 1 and the comparative example 1 and the cogging torque decreases as compared with that of the comparative example 1, and the reason is that asymmetric third notch 11-3 and fourth notch 11-4 are formed in each tooth 11-2 of the stator core 11 and asymmetric first notch 21-1 and second notch 21-2 are also formed in the stator core 21, as described above.

Although the present disclosure was described above with reference to an embodiment, it would be understood by those skilled in the art that the components of the present disclosure may be changed and modified without departing from the scope of the present disclosure. Further, the present disclosure may be changed a lot for specific situations and materials without departing from the necessary range of the present disclosure. Therefore, the present disclosure is not limited only to the detailed description of the embodiment described above and all embodiments are included within claims.

The invention claimed is:

1. A motor having an asymmetric rotor core that includes:
a rotor core including a first slot and a second slot being circumferentially and continuously formed in an asymmetric arrangement;
a first permanent magnet configured to be inserted into the first slot with a first embedment angle, and a second permanent magnet configured to be inserted into the second slot with a second embedment angle, wherein the first embedment angle is different from the second embedment angle; and
a plurality of stator cores each having a ring-shaped yoke and a plurality of teeth extending inward from the yoke to wind a stator coil, the plurality of stator cores being spaced apart from each other with a gap on an outer side of the rotor core;
wherein the first embedment angle of the first permanent magnet is larger than the second embedment angle of the second permanent magnet with respect to a rotational direction of the rotor core; and
wherein a separation wall is positioned between the first slot and the second slot, wherein the separation wall is inclined at a predetermined angle such that an inner surface of the second permanent magnet is in contact with a first surface of the separation wall and a portion of an inner surface of the first permanent magnet is supported on a second surface of the separation wall,
wherein a stress reduction groove is formed on an inner side of the rotor core at a position biased from the separation wall to the first slot,
wherein a distance from a position where an inner edge of the inner surface of the first permanent magnet is in contact with an inner surface of the first slot to a deepest point in the stress reduction groove is larger than a distance from the deepest point in the stress reduction groove to an intersection of a virtual circumferential extending line of the inner side of the rotor core and a line passing through a center of the stress reduction groove.

2. The motor of claim 1, wherein a first supporting portion protrudes from an upper end of an inner surface of the first slot to support an outer edge of the inner surface of the first permanent magnet.

3. The motor of claim 1, wherein a second supporting portion protrudes from a lower end of an outer surface of the first slot to support an inner edge of an outer surface of the first permanent magnet.

4. The motor of claim 1, wherein a third supporting portion protrudes from a lower end of an outer surface of the second slot to support an inner edge of an outer surface of the second permanent magnet.

5. The motor of claim 1, wherein the stress reduction groove has an arc-shaped cross-section that is concave toward the outer side of the rotor core.

6. The motor of claim 1, wherein the first embedment angle of the first permanent magnet and the second embedment angle of the second permanent magnet are selected from a range of 5 to 10 degrees, such that the first embedment angle is larger than the second embedment angle.

7. The motor of claim 1, further comprising asymmetric first and second notches formed on the outer side of the rotor core adjacent to the first slot and the second slot, respectively, wherein one of a width and an angle of the first and second notches are different.

8. The motor of claim 1, further comprising a symmetric third and fourth notches formed on an end of each of the teeth of the stator core, facing the rotor core, wherein one of a width and an angle of the third and fourth notches are different.

9. A motor having an asymmetric rotor core that includes:
a rotor core including a first slot and a second slot being circumferentially and continuously formed in an asymmetric arrangement;
a first permanent magnet configured to be inserted into the first slot with a first embedment angle, and a second permanent magnet configured to be inserted into the second slot with a second embedment angle, wherein the first embedment angle is different from the second embedment angle; and
a plurality of stator cores each having a ring-shaped yoke and a plurality of teeth extending inward from the yoke to wind a stator coil, the plurality of stator cores being spaced apart from each other with a gap on an outer side of the rotor core;
wherein the first embedment angle of the first permanent magnet is larger than the second embedment angle of the second permanent magnet with respect to a rotational direction of the rotor core; and
wherein a separation wall is positioned between the first slot and the second slot, wherein the separation wall is inclined at a predetermined angle such that an inner surface of the second permanent magnet is in contact with a first surface of the separation wall and a portion of an inner surface of the first permanent magnet is supported on a second surface of the separation wall,
wherein a stress reduction groove is formed on an inner side of the rotor core at a position biased from the separation wall to the first slot,
wherein a distance from a position where an inner edge of the inner surface of the first permanent magnet is in contact with an inner surface of the first slot to a deepest point in the stress reduction groove is double a distance from the deepest point in the stress reduction groove to an intersection of a virtual circumferential extending line of the inner side of the rotor core and a line passing through a center of the stress reduction groove.

10. A motor having an asymmetric rotor core that includes:
a rotor core including a first slot and a second slot being circumferentially and continuously formed in an asymmetric arrangement;
a first permanent magnet configured to be inserted into the first slot with a first embedment angle, and a second permanent magnet configured to be inserted into the second slot with a second embedment angle, wherein the first embedment angle is different from the second embedment angle; and
a plurality of stator cores each having a ring-shaped yoke and a plurality of teeth extending inward from the yoke to wind a stator coil, the plurality of stator cores being spaced apart from each other with a gap on an outer side of the rotor core;
wherein the first embedment angle of the first permanent magnet is larger than the second embedment angle of the second permanent magnet with respect to a rotational direction of the rotor core; and wherein a separation wall is positioned between the first slot and the second slot, wherein the separation wall is inclined at a predetermined angle such that an inner surface of the second permanent magnet is in contact with a first surface of the separation wall and a portion of an inner surface of the first permanent magnet is supported on a second surface of the separation wall, wherein a stress reduction groove is formed on an inner side of the rotor core at a position biased from the separation wall to the first slot, wherein a distance from a position where an inner edge of the inner surface of the first permanent magnet is in contact with an inner surface of the first slot to a deepest point in the stress reduction groove is the same as a distance from the deepest point in the stress reduction groove to a center of the stress reduction groove.

11. The motor of claim 10, wherein a first supporting portion protrudes from an upper end of an inner surface of the first slot to support an outer edge of the inner surface of the first permanent magnet.

12. The motor of claim 10, wherein a second supporting portion protrudes from a lower end of an outer surface of the first slot to support an inner edge of an outer surface of the first permanent magnet.

13. The motor of claim 10, wherein a third supporting portion protrudes from a lower end of an outer surface of the second slot to support an inner edge of an outer surface of the second permanent magnet.

14. The motor of claim 10, wherein the stress reduction groove has an arc-shaped cross-section that is concave toward the outer side of the rotor core.

15. The motor of claim 10, wherein the first embedment angle of the first permanent magnet and the second embedment angle of the second permanent magnet are selected from a range of 5 to 10 degrees, such that the first embedment angle is larger than the second embedment angle.

16. The motor of claim 10, further comprising asymmetric first and second notches formed on the outer side of the rotor core adjacent to the first slot and the second slot, respectively, wherein one of a width and an angle of the first and second notches are different.

17. The motor of claim 10, further comprising a symmetric third and fourth notches formed on an end of each of the teeth of the stator core, facing the rotor core, wherein one of a width and an angle of the third and fourth notches are different.

* * * * *